US008275118B2

United States Patent
Flannery et al.

(10) Patent No.: US 8,275,118 B2
(45) Date of Patent: Sep. 25, 2012

(54) METHOD AND SYSTEM FOR CONTROLLING ESTABLISHMENT OF COMMUNICATION CHANNELS IN A CONTACT CENTRE

(75) Inventors: Peter Flannery, Galway (IE); Enda Dooley, Galway (IE); Padraic Walsh, Galway (IE); Martin Kenirons, Galway (IE)

(73) Assignee: Rockstar Bidco, L.P., New York, NY (US)

( * ) Notice: Subject to any disclaimer, the term of this patent is extended or adjusted under 35 U.S.C. 154(b) by 448 days.

(21) Appl. No.: 12/549,534

(22) Filed: Aug. 28, 2009

(65) Prior Publication Data
US 2011/0051921 A1 Mar. 3, 2011

(51) Int. Cl.
*H04M 3/523* (2006.01)
*H04L 29/06* (2006.01)
(52) U.S. Cl. ............... 379/265.09; 379/265.13
(58) Field of Classification Search ............. 379/265.01–265.14, 266.09, 266.1
See application file for complete search history.

(56) References Cited

U.S. PATENT DOCUMENTS

| 6,430,619 B1* | 8/2002 | Sitaraman et al. ............ 709/225 |
| 7,729,688 B2* | 6/2010 | Cheung et al. ............... 455/418 |
| 2003/0041136 A1* | 2/2003 | Cheline et al. ............... 709/223 |
| 2003/0041146 A1 | 2/2003 | Davis |
| 2009/0214020 A1* | 8/2009 | Evanchik et al. ........ 379/265.06 |
| 2011/0191859 A1* | 8/2011 | Naslund et al. ................ 726/27 |

OTHER PUBLICATIONS

International Search Report and Written Opinion in PCT/GB2010/001632, Mar. 10, 2011.

* cited by examiner

*Primary Examiner* — Harry Hong
(74) *Attorney, Agent, or Firm* — Christopher & Weisberg, P.A.

(57) ABSTRACT

A method for controlling establishment of a communication channel between a service provider terminal of a contact center and a service request terminal is disclosed. The method comprises responding to receipt of a request to establish the communication channel by:
a) determining whether a license for a media type associated with the communication channel is allocated to the service provider terminal;
b) if a license is determined to be allocated to the service provider terminal, allowing establishment of the communication channel;
c) if a license is determined not to be allocated to the service provider terminal, determining availability of a license from a pool of licenses;
d) if a license is determined not to be available, refusing establishment of the communication channel; and
e) if a license is determined to be available, allocating the license to the service provider terminal and allowing establishment of the communication channel.

13 Claims, 3 Drawing Sheets

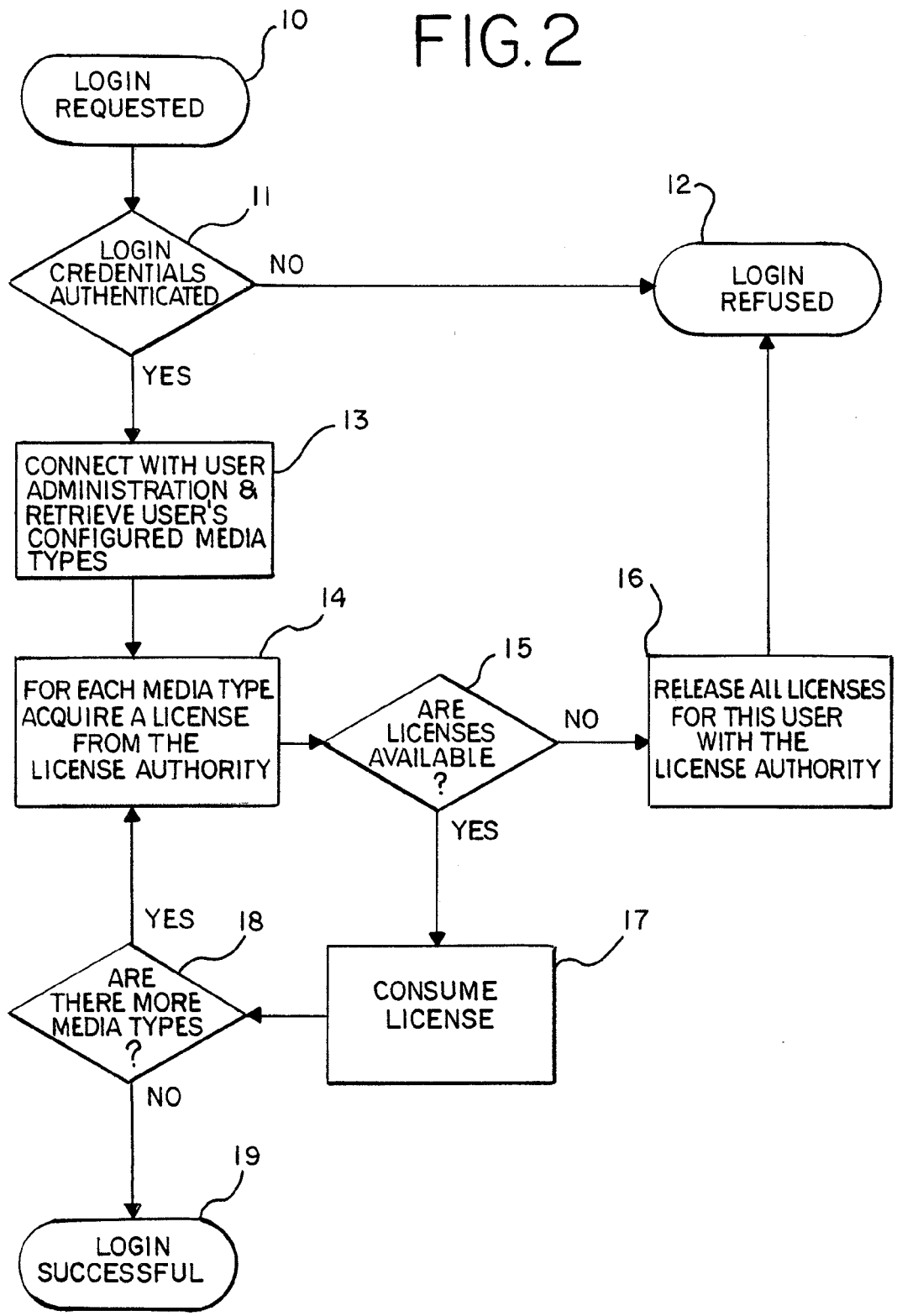

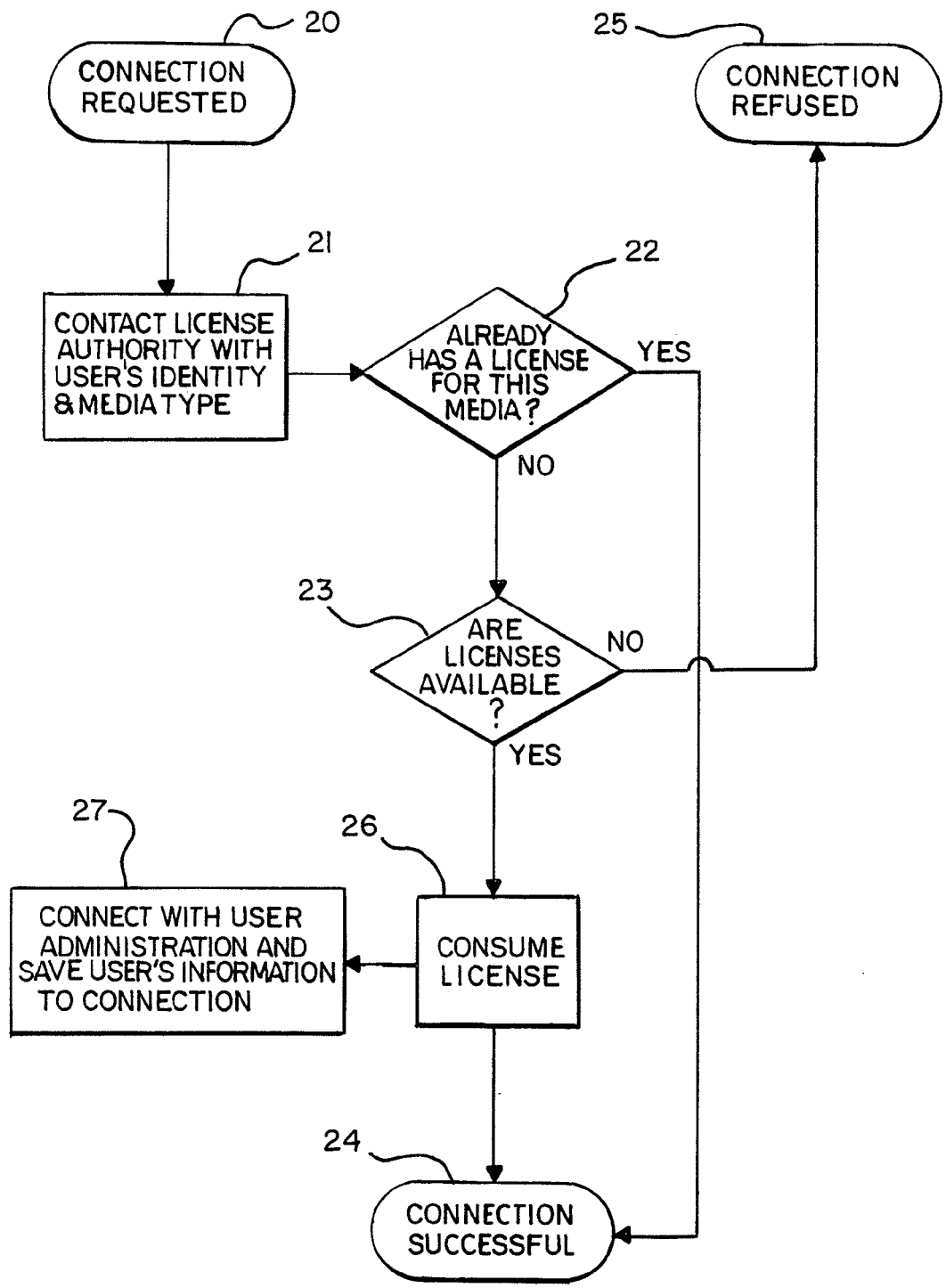

METHOD AND SYSTEM FOR CONTROLLING ESTABLISHMENT OF COMMUNICATION CHANNELS IN A CONTACT CENTRE

FIELD OF THE INVENTION

This invention relates to a method and system for controlling establishment of a communication channel between a service provider terminal of a contact centre and a service request terminal.

For the purposes of this document the term "service provider terminal" is defined as the terminal of a user (agent or expert) which is directly or indirectly associated with the contact center service. This terminal can be located anywhere inside or outside the enterprise providing the contact center service. For the purposes of this document the term "service request terminal" means the terminal of a user requesting the contact center service, generally a customer of the contact center service. This terminal can be located anywhere inside or outside the enterprise providing the contact center service.

BACKGROUND TO THE INVENTION

FIG. 1 shows a contact centre 1 for handling customer queries which are received by a company. Such systems are extremely widely used for connecting customers' calls to a group of agents who can assist the customer with their queries.

The contact centre 1 comprises three main components. These are a contact centre switch 2, which handles reception of calls from customers 4 and routes them to an appropriate one of the group of agents 6; a license authority 3, which manages the allocation of licenses to the group of agents 6; and a user administration server 4, which handles information about each of the group of agents 6, such as which media types they can receive queries on.

The customers 5 can connect to the contact centre 1 via any of a variety of media types, such as voice (i.e. mobile or landline telephony), e-mail, hypertext transfer protocol data gathered from a website for example, instant messaging, and short messaging service (SMS).

As shown, the group of agents 6 operate in the "Front Office" of the company, which is the section or department of the company responsible for receiving and handling customer queries.

There is also a "Back Office", which doesn't normally interact with the customers 5 or handle their queries. However, there are a group of experts 7 within the Back Office, who can be contacted by any of the group of agents 6 if the nature of a query is beyond the level of knowledge or experience of the agent. In this event, the expert will hopefully be able to assist with handling and successfully disposing of the customer's query.

The quantity of queries from customers, and the media types for the communication channels over which those queries are received, is determined by the availability of licenses from a license server, such as the license authority 3. Typically, a company will purchase a given number of licenses which are allocated as needed to the agents 6 of the contact centre 1.

The manner in which the licenses are allocated in a typical scenario is in accordance with the flow chart of FIG. 2. The process of license allocation to one of the agents 6 starts when the agent attempts to login to the contact centre 1 in step 10. The contact centre 1 performs an authentication process on the login details provided by the agent in step 11. If the login details cannot be authenticated then the login request is refused in step 12.

If, on the other hand, the login details are determined to be valid in step 11 then, in step 13, a connection with the user administration server 4 is established and details of the media types that the agent is configured to handle are retrieved. These details are used by the contact centre to determine whether a query received on a particular media type can be passed to the agent.

They are also used to attempt to acquire a license, in step 14, from the license authority 3 for each of the media types for which details were retrieved from the user administration server 4. This is done by requesting from the license authority 3 whether, for the first media type which the agent is configured to handle, a license is available in step 15. If a license is not available then all licenses already allocated (which will be none at this stage) are released in step 16 and the login is refused in step 12.

If, on the other hand, a license is available for the required media type then the license is allocated by the license authority 4 to (or "consumed by") the agent in step 17.

In step 18, if more licenses are required by the agent for other media types then processing reverts to step 14, which attempts to acquire the license as explained above. If any one of the licenses required is not available for allocation then all licenses already allocated will be released in step 16 and the login refused in step 12.

However, if all the licenses required are successfully allocated then the login is successful in step 19. The licenses allocated in this way are not released until the agent logs out of the contact centre 1, regardless of whether the agent is actively using the media type associated with a license. This, however, leads to a problem with this technique for license allocation, which will be explained by way of example below.

In the example, once the agent has logged on to the contact centre 1, they are presented with customer queries or requests on the media types which they are configured to handle. Whenever a customer query or request is routed to this agent, he can communicate directly with the customer using a communication channel established via the contact centre switch 2.

Whilst handling a query or request, the agent may need assistance from one of the experts 7 in the back office. The agent can connect to one of the experts 7 as appropriate and consult with them regarding the customer's query or request. This does not require allocation of any additional licenses from the license authority 3.

If he feels it is necessary, the agent may connect the customer directly to the expert via the contact centre switch 2. Now the customer, agent and expert can all communicate with each other using the appropriate media type. However, this again does not consume any additional licenses from the license authority 3.

If the agent feels that he is no longer required to handle the customer's request or query then he may decide to leave the further handling and disposal of the customer's request or query to the expert and move on to a new request. Thus, the expert and customer are now connected via the contact centre switch 2, which is being utilised without any licenses being allocated for the establishment of the communication channel via the contact centre switch 2.

As can be seen, the current technique for allocation of licenses in a contact centre environment does not adapt well to situations such as that given as an example above, and can result in the contact centre being utilised without any license allocation at all. This can lead to situations where the contact centre switch's capacity is achieved even though all the licenses have not been used.

SUMMARY OF THE INVENTION

In accordance with one aspect of the invention, there is provided a method for controlling establishment of a communication channel between a service provider terminal of a contact centre and a service request terminal, the method comprising responding to receipt of a request to establish the communication channel by:

a) determining whether a license for a media type associated with the communication channel is allocated to the service provider terminal;
b) if a license is determined to be allocated to the service provider terminal, allowing establishment of the communication channel;
c) if a license is determined not to be allocated to the service provider terminal, determining availability of a license from a pool of licenses;
d) if a license is determined not to be available, refusing establishment of the communication channel; and
e) if a license is determined to be available, allocating the license to the service provider terminal and allowing establishment of the communication channel.

Hence, the invention provides a method and system in which the license allocation and establishment of a communication channel are tied together: the communication channel may only be established if a license is available for allocation or has already been allocated. Thus, the resources of the contact centre are only available when a license can be allocated and the problem mentioned above is overcome.

Due to the invention, all users of the contact centre are allocated licenses in the same manner, and this reflects the activity of the contact centre more accurately. It is therefore helpful with planning contact centre capacity and the like using reporting data related to communications handled by the contact centre gathered during the contact centre's use. Establishment of communications through the contact centre are handled in the same way, irrespective of which users (e.g. the agents and experts) are involved. This is vital for accurate analysis of contact centre capacity requirements.

Typically, the allocation of a license for a media type associated with the communication channel to the service provider terminal is made by allocating the license to a user of the service provider terminal.

The media type associated with the communication channel may be one of: voice, e-mail, hypertext transfer protocol (HTTP), instant messaging and short message service (SMS).

The service provider terminal may be either one of a first type of terminal or one of a second type of terminal, the first type of terminal being capable of receiving incoming calls directly from the contact centre, and the second type of terminal being capable of joining incoming calls on request by a terminal of the first type.

Typically, the step of determining whether a license for a media type associated with the communication channel is allocated to the service provider terminal is performed by interrogation of a license server, which maintains a record of allocation of each of the licenses in the pool, the record indicating the identity of a service provider terminal and/or user to which each license is currently allocated.

Preferably, the step of determining availability of a license from a pool of licenses is performed by interrogation of a license server, which maintains a record of allocation of each of the licenses in the pool, the record indicating the identity of a service provider terminal and/or user to which each license is currently allocated.

In a typical embodiment, the step of allocating the license to the service provider terminal comprises receipt, at a license server, details of the identity of a terminal and/or user and updating a record of allocation of an unallocated license in the pool with the identity of the service provider terminal and/or user.

Preferably, the method further comprises storing a record of allowing establishment of the communication channel.

The record of allowing establishment of the communication channel may comprise the identity of the service provider terminal and/or user.

The record of allowing establishment of the communication channel typically comprises the time of establishment of the communication channel. In this case, the record of allowing establishment of the communication channel preferably comprises the length of time for which the communication channel is established.

In accordance with a second aspect of the invention, there is provided a contact centre system comprising one or more processors adapted to perform the method of the first aspect by controlling operation of a telecommunications switch coupled to the one or more processors and operable to establish one or more communication channels between one or more service provider terminals of a contact centre and one or more service request terminals.

In accordance with a third aspect of the invention, there is provided a computer program comprising computer-implementable instructions, which when executed by a programmable computer causes the programmable computer to perform a method in accordance with the first aspect.

In accordance with a fourth aspect of the invention, there is provided a computer program product comprising a computer program, which when executed by a programmable computer causes the programmable computer to perform a method in accordance with the first aspect.

Other aspects and features of the present invention will become apparent to those of ordinary skill in the art upon review of the following description of specific embodiments of the invention in conjunction with the accompanying figures.

DETAILED DISCLOSURE OF THE EMBODIMENT

An embodiment of the invention will now be described with reference to the accompanying drawings, in which:

FIG. 2 shows a prior art technique for license allocation within a contact centre.

FIG. 3 shows a technique for license allocation in accordance with an embodiment of the invention.

Specifically, in FIG. 3 there is shown a flowchart describing the technique by which licenses are allocated, and by which the establishment of communication channels through the call centre 1 is thereby controlled. The technique is performed using the call centre architecture shown in FIG. 1 and described above.

In the flowchart of FIG. 3, the license allocation technique starts, in step 20, with a request for a connection to be made. This could be a connection from one of the service request terminals of customers 5 to one of the service provider terminals of the group of agents 6 required to handle an incoming customer query, or it could be a connection between the service provider terminal of the agent and/or the service request terminal of the customer and a terminal of one of the group of experts 7, for example when joining an existing call between a customer and agent.

Figure 1:
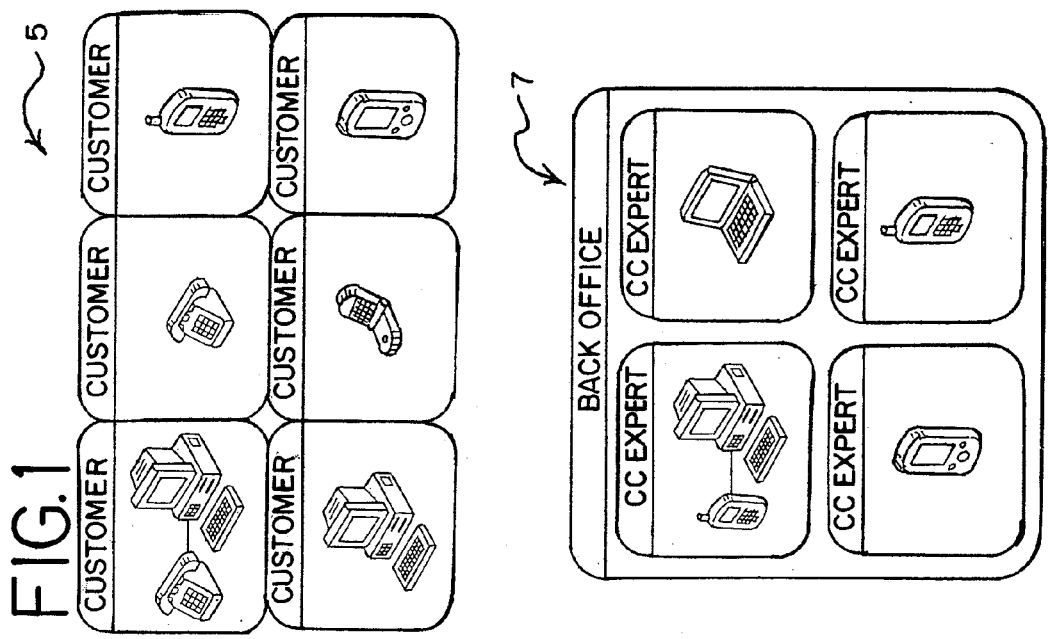
FIG. 1 shows a schematic representation of a contact centre on which the invention may be performed.
Figure 1:
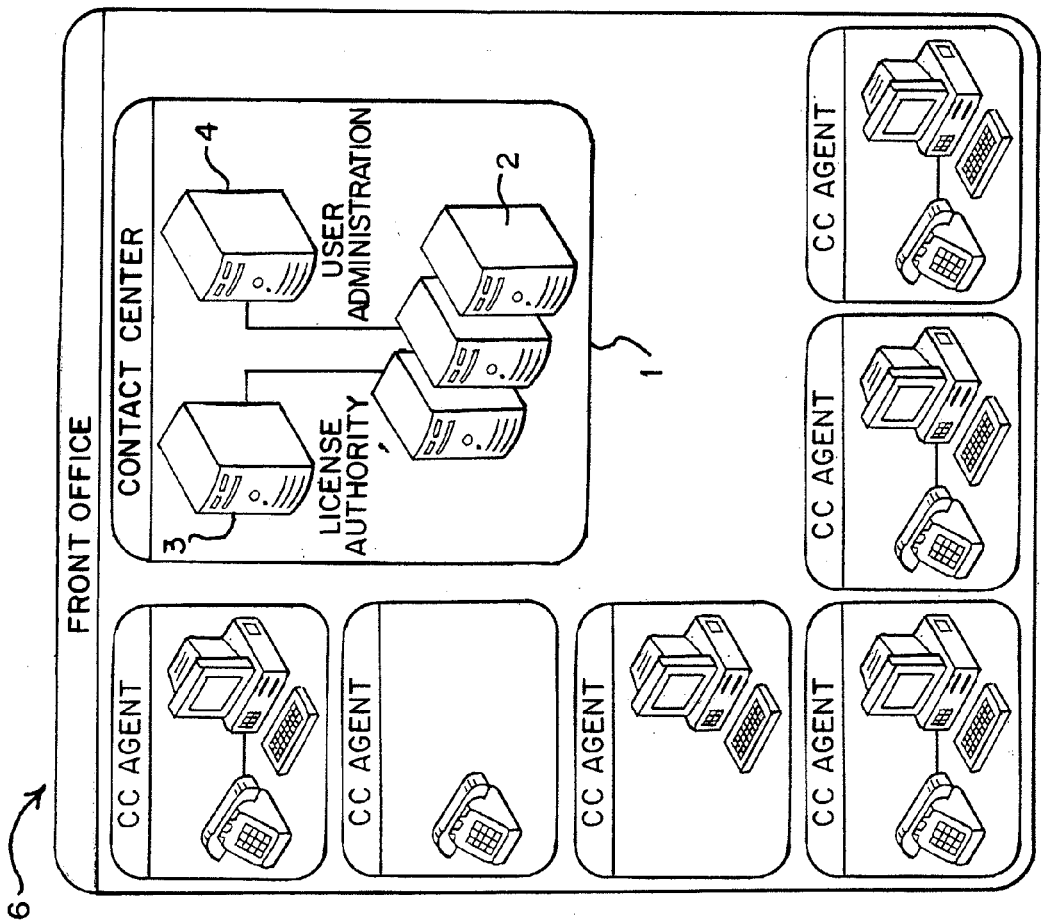

As before, and as shown schematically in FIG. 1, a variety of different media types of communication channel are supported, such as voice, e-mail, hypertext transfer protocol (HTTP), instant messaging and short message service (SMS).

In response to this connection request, in step 21 the license server 3 is sent details of the user's identity and the media type of the connection required (i.e. the media type for the communication channel which is required to be established). In step 22, it is determined whether the user of the service provider terminal (i.e. the agent or expert as appropriate) has a license for this media type already. This is done by interrogating the license server 3, which maintains a record of allocation of each of the licenses in a pool of licenses held and managed by the license server 3. The record indicates the identity of the service provider terminal and/or user to which each license is currently allocated. If a license has already been allocated to the service provider terminal and/or user then the connection request is granted in step 24 and the establishment of the communication channel is allowed.

If, on the other hand, the user does not already have a license for the media type associated with the communication channel to be established then, in step 23, the availability of a license from the pool of licenses is determined by interrogating the license server 3. This is done by interrogation of the license server 3, which maintains a record of allocation of each of the licenses in the pool, the record indicating the identity of the service provider terminal and/or user to which each license is currently allocated. If a license for this media type is not available (for example, because they have all been allocated already or none has been purchased) then the connection is refused in step 25 and the communication channel is not established.

However, if in step 23 a license for the media type of the communication channel is determined to be available then in step 26, the license for the media type associated with the communication channel to be established is allocated to the user of the service provider terminal. The allocation of the license to the service provider terminal involves sending to the license server 3 details of the identity of a terminal and/or user and updating the record of allocation of one of the unallocated licenses in the pool with the identity of the service provider terminal and/or user.

At the same time as the license is allocated in step 26, a record that the establishment of the communication channel is allowed is stored in the user administration server 4 in step 27. This record may include the identity of the service provider terminal and/or user and the time of establishment of the communication channel. When the channel is destroyed after it has been used, the record may be updated with details of the length of time for which the communication channel was established. Then in step 24, the connection is successfully allowed and the communication channel may be established.

As can be seen from the above description, the technique for controlling establishment of a communication channel is based on allocating licenses depending on the actual communication traffic that must be handled by the contact centre switch 2 rather than how many agents have logged in to the contact centre 1. This allows for more meaningful and precise pricing of the contact centre licenses to be made and also allows more accurate reporting of the activity of the contact centre to be performed.

Licenses are allocated by the method and system of the invention on a one-to-one basis based on users' (either the agents or the experts referred to above) activity. Thus, a license is allocated when contact centre switch 2 software is actually servicing a customer to agent or expert communication. Specifically, if an agent and an expert are working in conference on a customer query then two licenses would be allocated for the duration of that consultation as opposed to the single license that would previously have been allocated to the agent only. Similarly a single license would be consumed for the duration of a customer to expert communication where the agent originally involved has ceased to be involved with the communication.

The invention provides the ability to allow contact centre licenses to be sold based on an accurate reflection of the contact centre's use. Organisations using contact centres which employ or outsource growing pools of experts (or liaise with other organisational elements over contact centre channels such as Instant Messaging) will find their requirements for licenses expanding as their contact throughput increases. However, the same licenses will not be allocated unless they are being actively used. This invention more accurately reflects the usage of contact centre software resources than the conventional license allocation system and results in a more meaningful and precise pricing model.

The invention claimed is:

1. A method for controlling establishment of a communication channel between a service provider terminal of a contact centre and a service request terminal, the method comprising responding to receipt of a request to establish the communication channel by:
   a) determining, using one or more processors, whether a license for a media type associated with the communication channel is allocated to the service provider terminal;
   b) if a license is determined to be allocated to the service provider terminal, the one or more processors allowing establishment of the communication channel;
   c) if a license is determined not to be allocated to the service provider terminal, determining, using the one or more processors, availability of a license from a pool of licenses;
   d) if a license from the pool of licenses is determined not to be available, the one or more processors refusing establishment of the communication channel; and
   e) if a license from the pool of licenses is determined to be available, the one or more processors allocating the license from the pool of licenses to the service provider terminal and allowing establishment of the communication channel.

2. A method according to claim 1, wherein the allocation of a license for a media type associated with the communication channel to the service provider terminal is made by allocating the license to a user of the service provider terminal.

3. A method according to claim 1, wherein the media type associated with the communication channel is one of: voice, e-mail, hypertext transfer protocol (HTTP), instant messaging and short message service (SMS).

4. A method according to claim 1, wherein the service provider terminal is either one of a first type of terminal or one of a second type of terminal, the first type of terminal being capable of receiving incoming calls directly from the contact centre, and the second type of terminal being capable of joining incoming calls on request by a terminal of the first type.

5. A method according to claim 1, wherein the step of determining whether a license for a media type associated with the communication channel is allocated to the service provider terminal is performed by interrogation of a license server, which maintains a record of allocation of each of the licenses in the pool, the record indicating the identity of a service provider terminal and/or user to which each license is currently allocated.

6. A method according to claim 1, wherein the step of determining availability of a license from a pool of licenses is performed by interrogation of a license server, which maintains a record of allocation of each of the licenses in the pool, the record indicating the identity of a service provider terminal and/or user to which each license is currently allocated.

7. A method according to claim 1, wherein the step of allocating the license to the service provider terminal comprises receipt, at a license server, details of the identity of a terminal and/or user and updating a record of allocation of an unallocated license in the pool with the identity of the service provider terminal and/or user.

8. A method according to claim 1, further comprising storing a record of allowing establishment of the communication channel.

9. A method according to claim 8, wherein the record of allowing establishment of the communication channel comprises the identity of the service provider terminal and/or user.

10. A method according to claim 8, wherein the record of allowing establishment of the communication channel comprises the time of establishment of the communication channel.

11. A method according to claim 10, wherein the record of allowing establishment of the communication channel comprises the length of time for which the communication channel is established.

12. A contact centre system comprising one or more processors configured to perform the method of claim 1 by controlling operation of a telecommunications switch coupled to the one or more processors and operable to establish one or more communication channels between one or more service provider terminals of a contact centre and one or more service request terminals.

13. A non-transitory computer readable medium comprising program instructions, which when executed by a programmable computer causes the programmable computer to perform a method in accordance with claim 1.

* * * * *